United States Patent [19]

Kobayashi

[11] Patent Number: 5,128,577
[45] Date of Patent: Jul. 7, 1992

[54] BRUSH ARRANGEMENT FOR DC MOTOR
[75] Inventor: Kouji Kobayashi, Nitta, Japan
[73] Assignee: Mitsuba Electric Mfg. Co., Ltd., Gumma, Japan
[21] Appl. No.: 505,229
[22] Filed: Apr. 5, 1990
[30] Foreign Application Priority Data
 Apr. 25, 1989 [JP] Japan .................. 1-48624[U]
[51] Int. Cl.⁵ ............................................. H02K 13/00
[52] U.S. Cl. .................................. 310/233; 310/234; 310/248
[58] Field of Search ............... 310/233, 234, 236, 237, 310/248, 249, 239, 241, 244, 229, 230, 89, 154, 224

[56] References Cited

U.S. PATENT DOCUMENTS

| | | | |
|---|---|---|---|
| 1,785,183 | 12/1930 | Dake | 310/244 |
| 4,384,224 | 5/1983 | Spitler | 310/89 |
| 4,437,029 | 3/1984 | Ban et al. | 310/198 |
| 4,459,503 | 7/1984 | Kropp | 310/234 |
| 4,475,053 | 10/1984 | Mayer | 310/249 |
| 4,838,100 | 6/1989 | Tanaka | 310/154 |

FOREIGN PATENT DOCUMENTS 0672519 11/1965 Belgium ............................. 310/233

Primary Examiner—R. Skudy
Attorney, Agent, or Firm—Scully, Scott, Murphy & Presser

[57] ABSTRACT

A DC motor is provided with a brush arrangement in which two parts of the brushes are arranged around the peripheral surface of a commutator so that each line across the opposite brushes with respect to the central axis of the commutator forms an angle, thus the space between the positive and negative brushes is sufficient to mount components thereon. Each width of the brushes is determined by the number of conducting segments in contact with the brushes of the same polarity, affording sufficient current to flow in the brushes.

2 Claims, 3 Drawing Sheets 5,128,577

1

BRUSH ARRANGEMENT FOR DC MOTOR

BACKGROUND OF THE INVENTION

1. Field of the invention

The present invention relates to a multipolar dc motor having an improved brush arrangement, and more particularly, to the brush arrangement having a relatively large section area brush for large current and sufficient space for arranging components.

2. Prior art

One type of conventional six-pole dc motor having armature coil wound in the manner of double-layer wave windings known in the art comprises a pair of positive brushes and a pair of negative brushes. These four brushes are circumferentially disposed around a commutator at prescribed angular intervals, and are in sliding electrical contact with the commutator. The positive brushes are 120 degrees apart, and the negative brushes are also 120 degrees apart. A positive brush and an adjacent negative brush are 60 degrees apart, and another positive brush and another adjacent negative brush are also 60 degrees apart.

In the conventional dc motor mentioned above, however, each space between the positive brush and the adjacent negative brush is very tight to dispose the springs and the brush holders, therefore, the width of the brush holder is restricted from the space. Also, the width of the brush is restricted from the width of the brush holder, so that the section area of the brush is restricted. Because of this, the current density of the brush is at a higher level relation to the rated current density, so that the durability of the brush is relatively low.

SUMMARY OF THE INVENTION

In consideration of the above described difficulties, it is an object of the present invention to provide a brush arrangement for dc motor in which the space between the positive brush and negative brush can be made relatively wider.

Another object of the present invention is to provide a brush arrangement for dc motor in which the current density of the brush can be made relatively low.

In an aspect of the present invention, there is provided a DC motor having four brushes and six poles (not shown) the four brushes resiliently in contact with conducting segments of a cylindrical commutator, the DC motor comprising: each pair of the brushes arranged around peripheral surface of the commutator so that each brush lies opposite each other with respect to the central axis of the commutator, and so that each line across the opposite brushes intersects at the central axis of the commutator, thereby forming an angle between the positive brush and negative brush more than 60 degrees at the intersection of each line; and a plurality of the conducting segments formed along the peripheral surface of the commutator, the number of the plurality of the conducting segments is determined a value so that when the number of the conducting segments is divided by 3, the remainder of the division is greater than 0.5.

Accordingly, one pair of lines across the opposite brushes intersected at the central axis of the commutator forms an angle more than 60 degrees which is larger than the conventional one, thereby readily arranging components, such as spiral springs, between brush holders. The width of the brushes is determined by number

2 of the conducting segments in contact with the brushes having the same polarity so that the number of the conducting segments is less than 6, so that the section area of the brushes can be made larger than that of the conventional brushes. Because or this, the current density becomes in lower, and the durability of the brushes becomes in higher.

DESCRIPTION OF THE PREFERRED EMBODIMENT

Figure 1:
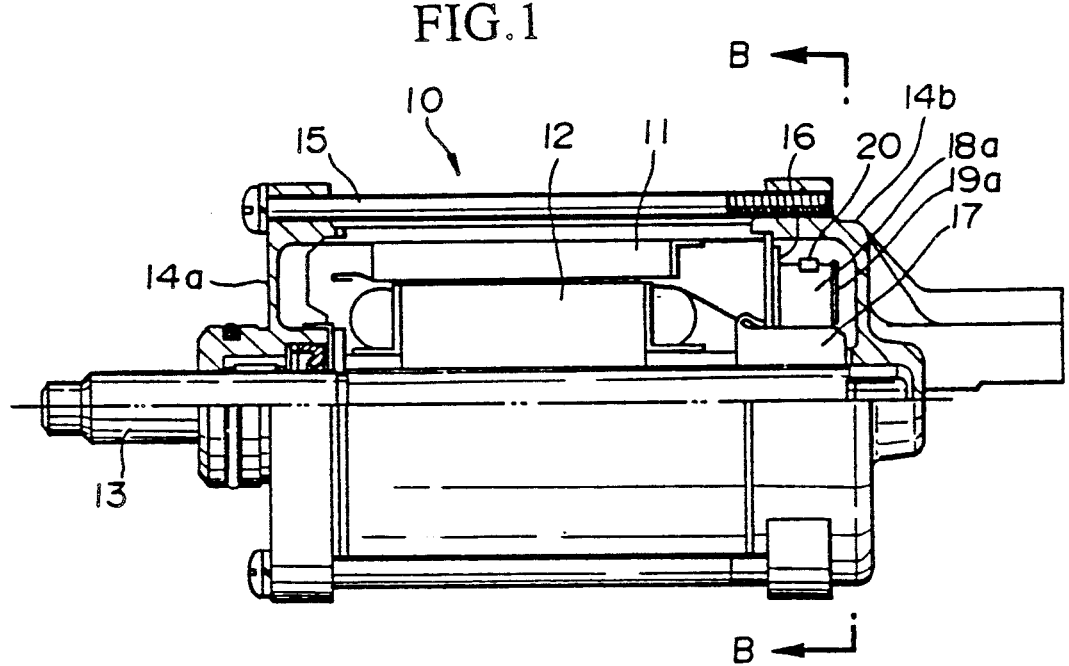
FIG. 1 is a section view of a general DC motor shown by the arrows A—A in FIG. 2.

Hereinafter, an embodiment of the present invention is described with reference to the drawings. FIG. 1 shows a six-pole dc motor 10 in accordance with the present invention. Magnets 11 are arranged on the inner peripheral surface of a cylindrical yoke (not shown). Armature 12 is arranged within magnets 11, and shaft 13 of armature 12 is rotatably supported by opposite end brackets 14a and 14b, both of which are secured by bolts 15. Armature 12 is provided coil with the core wound around in the manner of double-layer wave winding. Annular brush stay 16 is mounted on the inner face of the rear bracket 14b so as to be arranged around the end portion of shaft 13, that is, so as to surround the end portion of shaft 13. The end portion of shaft 13 has commutator 17 which fixedly fits around that of shaft 13. Brush 18a which is described later is retained by brush holder 19a, and also, is urged by the end portion of spring 20. The arrangement of the brush, brush holder, and spring is described with reference to FIG. 2.

Figure 2:
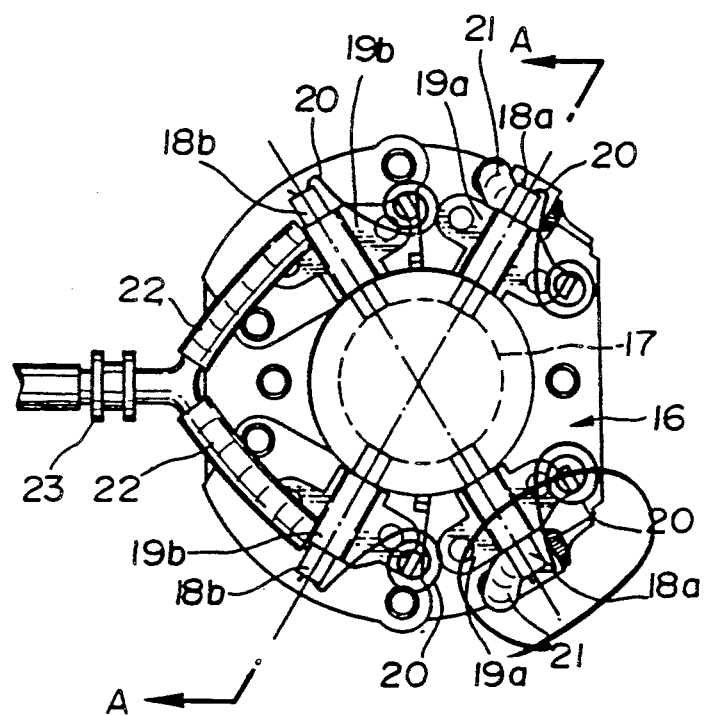
FIG. 2 is a front view of a brush arrangement shown by the arrows B—B in FIG. 1.

In FIG. 2, brush holders 19a and 19a are mounted on brush stay 16. The brush holder 19b and 19b insulate and are mounted on brush stay 16. Each of the brush holders 19a, 19a, 19b, and 19b is made of a metal plate formed into a gutter-like configuration having a rectangular cross section. These brush holders 19a, 19a, 19b, and 19b are circumferentially arranged at angular intervals on the annular brush stay 16 so as to surround commutator 17. In addition, brush holders 19a and 19a receive a pair of negative brushes 18a and 18a, respectively, while the other brush holders 19b and 19b receive a pair of positive brushes 18b and 18b, respectively. These brushes 18a, 18a, 18b, and 18b are slidably positioned in brush holders 19a, 19a, 19b, and 19b in radial direction. Four spiral springs 20 are mounted on brush holders 19a, 19a, 19b, and 19b, two of which are mounted between narrower portion between brush holders 19a and 19b to urge each end surface of the positive brushes 18b and 18b, respectively, and the other two of which are mounted on the wider portion between brush holders 19a and 19a to urge each one end surface of the negative brushes 18a and 18a, respectively. Accordingly, each other end surfaces of the brushes 18a, 18a, 18b, and 18b are resiliently contacted to the outer peripheral surface of commutator 17. In addition, pigtails 21 and 21 are extended from respective negative brushes 18a and 18a, and grounded to brush stay 16. While pigtails 22 and 22 are also extended from respective positive brushes 18b and 18b, and connected each other for a power source through grommet 23.

Figure 3:
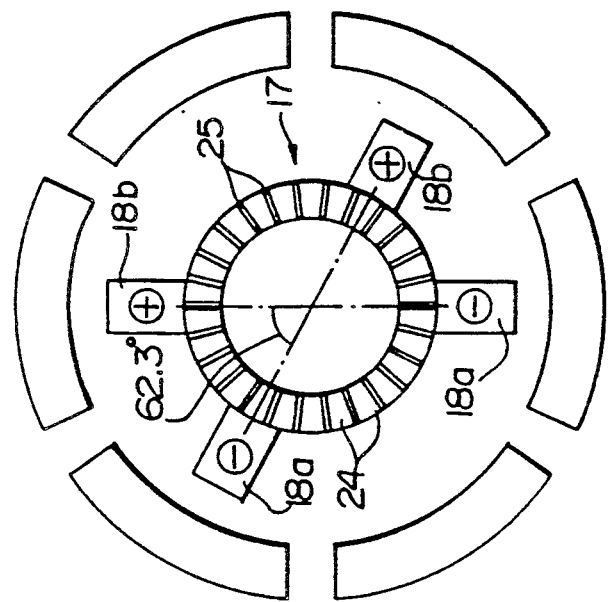
FIG. 3 and FIG. 4 diagrammatic views showing a brush arrangement of an embodiment or the present invention.
Figure 4:
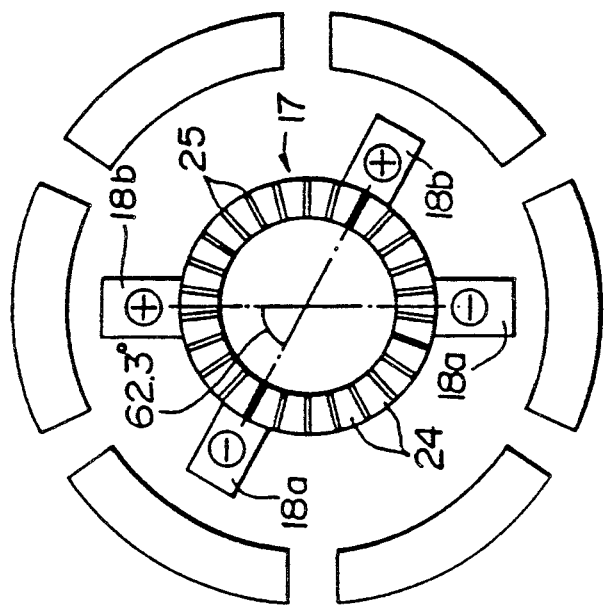

The brush arrangement is shown in FIG. 3 and FIG. 4. FIG. 4 shows that commutator 17 is slightly rotated with respect to FIG. 3. Commutator 17 is composed of a number of segments 24 with slits provided between segments, and integrally forming with insulation resign 25. Accordingly, each of the segments 24 is insulated by insulation resign 25. The number of the segments 24 is the same as that of the slots for armature 12. The number of the slots is twentysix pieces in this embodiment.

One pair of positive and negative brushes 18b and 18a is opposite to each other with respect to the center of commutator 17, and other pair of brushes of positive and negative brushes 18b and 18a is also opposite to each other. Also, when one positive brush 18b is positioned at the center of a segment 24, the other positive brush 18b is positioned between the adjacent segments 24, in which a slit (not identified in FIG. 4) is present between the segments in the central position with respect to the other brush of the pair of brushes. In case of the negative brushes 18a, these are the same relationship described above. In this case, eight and half pieces of the segments 24 are present between the same polarity of the brushes.

In case of the six-pole dc motor, the different polarity brushes can be arranged at every 60 degrees apart, on the other hand, the same polarity brushes can also be arranged at every 120 degrees apart. The number of the segments 24 which is arranged between the sam polarity brushes is determined by the following equation;

$$P = n \times (120/360) = n/3$$

where "P" represents the number of the segments between the same polarity brushes, and "n" represents the number of the segments.

If the number of the segments "n" is substituted for "26", the following value is obtained;

$$P = 26/3 = 8.67$$

It is noted that the number of the segments between the same polarity brushes is 8.67 pieces.

Thus, the number of the segments 24 between the same polarity brushes is less than the conventional arrangement by 0.17, so that the interval between the same polarity brushes becomes narrower than the conventional arrangement. While the interval between the different polarity becomes wider.

In the case that the total number of the segments 24 or the slots is divided by "3", the decimal place of the result is larger than "0.5". Also, one of the same polarity brushes is positioned at the center of the segment 24, and the other is positioned between the adjacent brushes. As a result, the interval angle between the different polarity brushes becomes 62.3 degrees which makes 2.3 degrees wider than the conventional interval angle which is 60 degrees.

In addition, even though commutator 17 is rotated from the states shown in FIG. 3 to FIG. 4, the interval angle is determined so that the segments 24 which are not contacted with the brushes between the same polarity is not less than "6", so that the maximum width of the brushes can be obtained without reducing the number of the segments 24.

In this embodiment, the number of the segments 24 is twentysix pieces, but twentythree or twentynine pieces of the segments 24 can be used. For example, assuming that "23" is substituted for "n" in the above equation, $P = 23/3 = 7.67$ is obtained, therefore the value in which the decimal place, "0.67" is also larger than "0.5". In addition, "29" is substituted for "n", $P = 29/3 = 9.67$ is obtained.

Figure 5:
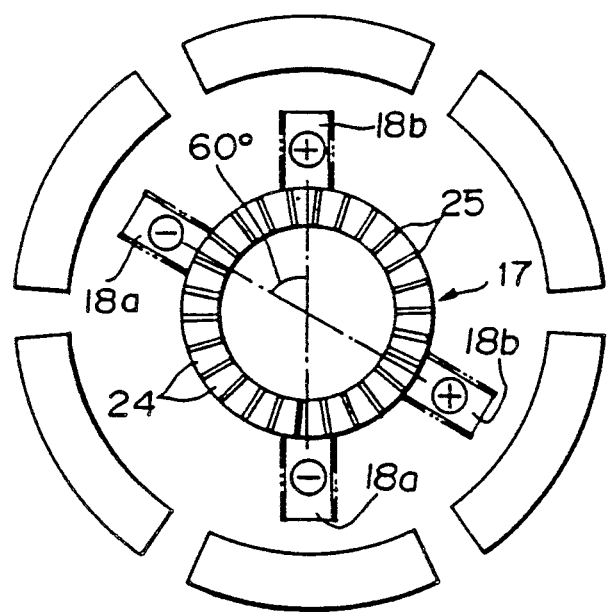
FIG. 5 is a diagrammatic view showing a brush arrangement in comparison with the conventional type.

The brush arrangement of the embodiment in comparison with that of the conventional dc motor is described with reference to FIG. 5.

Assuming that the total number of the segments 24 is twentysix pieces which are the same number of the above embodiment. Also, each narrower opposite angle is 60 degrees apart, while each wider opposite angle is 120 degrees apart. In the order that the conventional brush arrangement meets the operation principle of the dc motor, that is, when one opposite negative and positive brushes 18a and 18b are contacted with six segments 24, the other opposite negative and positive brushes 18a and 18b are contacted with four segments 24, each width of brushes 18a, 18a, 18b, and 18b must be narrower than that of the embodiment as shown by the chain double-dash line. In addition, each narrower opposite angle is 60 degrees smaller than the angle of the embodiment which is 62.3 degrees.

Accordingly, the width of the brushes in the embodiment is wider than that of the conventional brushes, so that the section area of the brushes can be made larger than that of the conventional brushes. Because of this, the current density becomes in lower, and the durability of the brushes becomes in higher. In addition, the narrower opposite angle is wider than that of the conventional thereof, so that it is easy to arrange components, such as springs 20 and brush holders 19a and 19b, between brush holders 19a and 19b on brush stay 16.

The preferred embodiment described herein are illustrative and not restrictive. The scope of the invention is indicated by the appended claims and all variations which fall within the claims are intended to be embraced therein.

What is claimed is:

1. A DC motor having four brushes and six poles, a cylindrical commutator having conducting segments the four brushes being in resilient contact with said conducting segments, the DC motor comprising:

each pair of the brushes being arranged around a peripheral surface of the commutator so that each brush lies opposite each other with respect to a central axis of the commutator such that a line extended between the opposite brushes intersects at the central axis of the commutator, thereby forming an angle of more than 60 degrees at the intersection of each line such that, when a conducting segment of said commutator is in a central position with respect to one of a pair of said brushes, a slit which is present between conducting segments is in a central position with respect to the other brush of said pair of brushes; and a plurality of the conducting segments being formed along the peripheral surface of the commutator, the number of the plurality of the conducting segments being determined at a value so that when the number of the conducting segments is divided by 3, the remainder of the division is greater than 0.5, thereby one brush of a pair of brushes of same polarity is positioned at a center of a conducting segment, and the other brush of said pair of brushes is positioned between adjacent conducting segments.

2. A DC motor having four brushes and six poles according to claim 1, wherein the width of the brushes with respect to the circumference of the commutator is determined by the number of the conducting segments in contact with the brushes having the same polarity so that the number of the conducting segments is less than 6.

* * * * *